United States Patent [19]
Nitschke

[11] 4,360,374
[45] Nov. 23, 1982

[54] ROLL OPERATOR FOR GLASS SHEET CONVEYOR OF BENDING SYSTEM

[76] Inventor: John S. Nitschke, 324 E. Second, Perrysburg, Ohio 43551

[21] Appl. No.: 310,332

[22] Filed: Oct. 13, 1981

Related U.S. Application Data

[63] Continuation-in-part of Ser. No. 209,782, Nov. 24, 1980, abandoned.

[51] Int. Cl.³ .................................... C03B 23/025
[52] U.S. Cl. ...................................... 65/273; 65/163; 65/348; 65/351
[58] Field of Search ................ 65/163, 273, 348, 351

[56] References Cited

U.S. PATENT DOCUMENTS

| | | |
|---|---|---|
| 3,778,244 | 12/1973 | Nedelec . |
| 3,806,312 | 4/1974 | McMaster et al. . |
| 3,934,970 | 2/1976 | McMaster et al. . |
| 3,947,242 | 3/1976 | McMaster et al. . |
| 3,994,711 | 11/1976 | McMaster . |
| 4,071,344 | 1/1978 | Blausey, Jr. .................. 65/163 X |
| 4,133,667 | 1/1979 | Nitschke . |
| 4,202,681 | 5/1980 | McMaster et al. . |
| 4,204,854 | 5/1980 | McMaster et al. . |
| 4,222,763 | 9/1980 | McMaster . |
| 4,282,026 | 8/1981 | McMaster et al. . |
| 4,297,121 | 10/1981 | Rhonehouse ................. 65/351 X |

Primary Examiner—Arthur D. Kellogg
Attorney, Agent, or Firm—Reising, Ethington, Barnard, Perry & Brooks

[57] ABSTRACT

A glass sheet bending system (10) disclosed includes a horizontal roller conveyor (16) having a roll operator for operating a plurality of conveyor rolls (18) adjacent an associated bending apparatus (22) to control conveyance thereon independent of conveyance on the other rolls of the conveyor. In one embodiment, the roll operator comprises a roll shifter (24) for shifting the rolls (18) along the direction of conveyance during continued rotational driving. In another embodiment, the roll operator comprises a positioning drive (140), that drives the conveyor rolls (18) adjacent the bending apparatus (22) independently of the other rolls of the conveyor. Both embodiments reduce the rate of glass sheet conveyance as the holder receives each glass sheet to reduce sliding at a surface (62) of the holder. Also, repositioning of leading and trailing glass sheets can be initially performed along the direction of conveyance to provide accurate location of the sheets on the holder with respect to each other in preparation for bending on associated molds (68).

13 Claims, 11 Drawing Figures

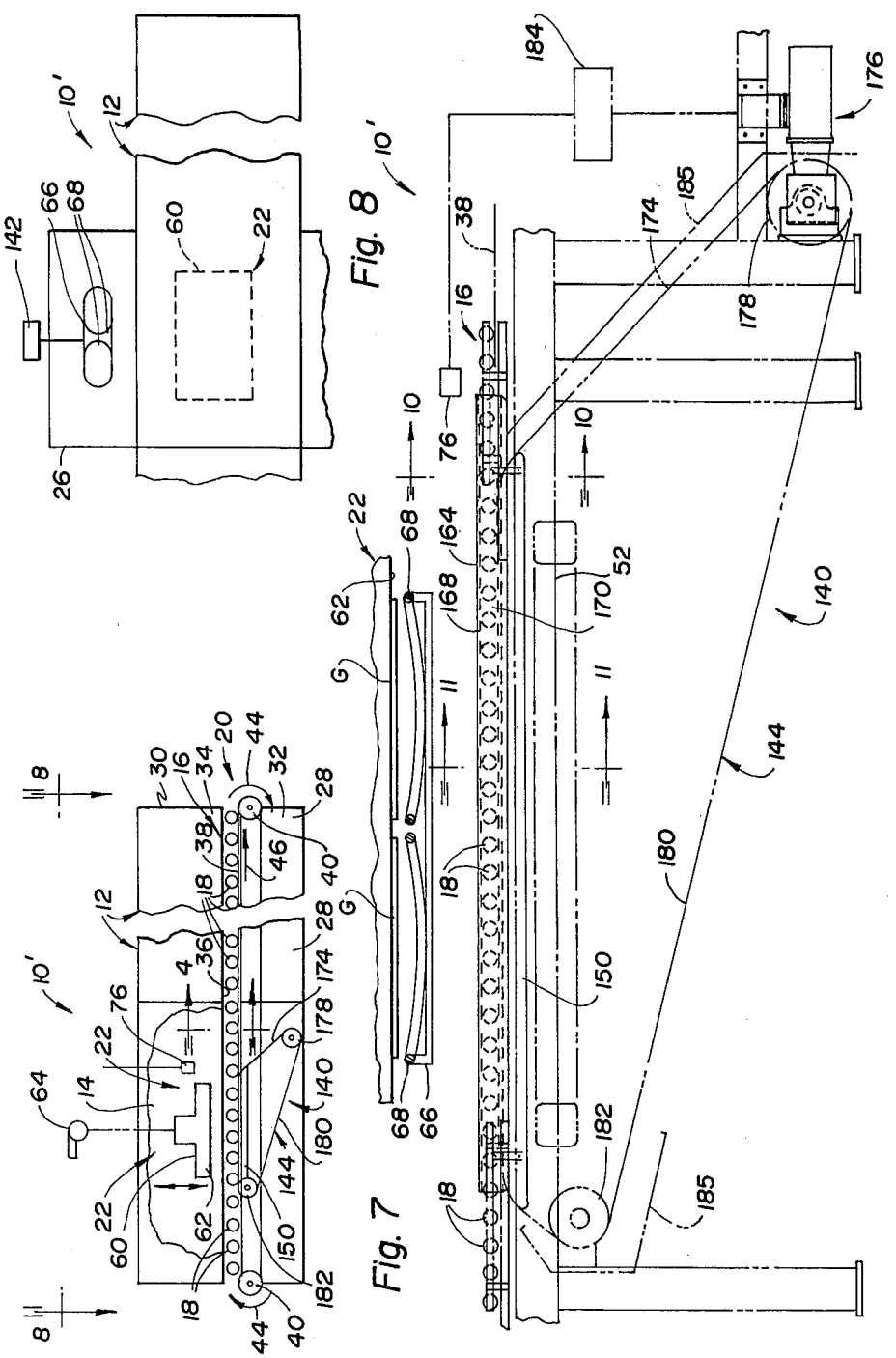

ROLL OPERATOR FOR GLASS SHEET CONVEYOR OF BENDING SYSTEM

CROSS REFERENCE TO RELATED APPLICATIONS

This application is a continuation-in-part of application Ser. No. 209,782 which was filed on Nov. 24, 1980, now abandoned.

TECHNICAL FIELD

This invention relates generally to systems for bending glass sheets and, more particularly, to roller conveyors for conveying heated glass sheets in preparation for bending.

BACKGROUND ART

Prior glass bending systems such as, for example, the ones disclosed by U.S. Pat. Nos. 3,778,244, 4,202,681, 4,204,854, and 4,282,026 include bending apparatus having a holder positioned within a heating chamber above a roller conveyor to receive a heated glass sheet from the conveyor in preparation for bending. High quality glass can be achieved with this type of system if the conveyance is continued as the glass sheet is received by the holder from the conveyor since the glass sheet is then never stationary on the rollers in a manner that can result in roller marking of the lower glass surface. However, continued conveyance of the glass sheet as it is received by the holder necessarily results in sliding between the upper surface of the glass sheet and a downwardly facing surface of the holder. The surface material of the holder at which the sliding takes place must be capable of withstanding the sliding action and the heat involved without marking the upper surface of the glass sheet in its softened state. After the holder receives the heated glass sheet, a mold is moved under the holder and receives the heated glass sheet for bending. In certain applications, subsequent rapid cooling of the bent glass sheet provides tempering thereof to increase the glass strength and resistance to breakage.

Quite often, a pair of symmetrical right and left glass sheets are simultaneously bent such as in the manufacturing of right and left windows for vehicles. When a pair of sheets are bent on the type of system discussed above, it is conventional for one sheet to be conveyed forward of the other sheet in leading and trailing positions as the sheets are heated from room temperature to a sufficiently high temperature for bending. After the glass sheets have been conveyed for a sufficient distance to be heated to the required temperature, the longitudinal spacing therebetween along the direction of conveyance can change from the initial position due to slippage between the conveyor rollers and the glass sheets. Since the molds which receive the glass sheets from the holder are positioned in a fixed relationship with respect to each other, it is important for the glass sheets to be uniformly spaced with respect to each other and at the same location on the holder during each cycle in order to perform bending of both sheets to the desired shape. Repositioning of the glass sheets with respect to each other can be accomplished by holding one sheet as the conveyance of the other continues. However, such repositioning results in slippage between the sheet that is held and the rolls of the conveyor and can produce scratches on the lower roll supported glass surface.

DISCLOSURE OF INVENTION

One object of the present invention is to provide a glass sheet bending system that reduces sliding of a heated glass sheet with respect to bending apparatus upon being received thereby from an associated horizontal roller conveyor as the conveyance of the glass sheet on the conveyor is continued in order to prevent roll marking of the glass.

Another object of the present invention is to provide a glass sheet bending system capable of repositioning leading and trailing glass sheets with respect to each other on a roller conveyor without any slippage between either sheet and the conveyor rolls in preparation for being received by bending apparatus to perform bending of the glass sheets.

In carrying out the above objects, a glass sheet bending system constructed in accordance with the present invention includes a horizontal roller conveyor for conveying heated glass sheets. The conveyor includes elongated rolls which extend horizontally transverse to the direction of conveyance in a parallel relationship to each other, and each roll has a central rotational axis. A drive mechanism rotatively drives the rolls about the rotational axes thereof to convey heated glass sheets supported thereby. Bending apparatus of the system receives heated glass sheets from the conveyor to perform the bending. A roll operator of the system operates a plurality of rolls adjacent the bending apparatus to control movement thereof and glass sheet conveyance thereon independent of the glass sheet conveyance on the other rolls of the conveyor.

In one embodiment, the roll operator comprises a roll shifter for shifting the associated rolls adjacent the bending apparatus along the direction of conveyance during continued driving thereof by the drive mechanism so as to thereby control the conveyance of any glass sheet supported by the shifted rolls. Shifting of the rolls is performed in a direction opposite to the direction of conveyance to reduce and preferably completely eliminate sliding of the glass sheet with respect to the bending apparatus as the glass sheet is received thereby from the conveyor. Any suitable sensing system can be utilized when leading and trailing glass sheets are conveyed so as to sense the conveyance of one of the glass sheets onto the shiftable rolls and then shift these rolls either upstream or downstream to reposition the glass sheet supported thereon with respect to the other sheet while continuing to drive the shifted rolls so that no marking of the shifted sheet takes place. When the system with the roll shifter is utilized to simultaneously bend two glass sheets, two shifting operations are sequentially performed to initially reposition the glass sheets with respect to each other and to thereafter reduce and preferably completely eliminate any sliding as the glass sheets are received by the bending apparatus.

The roll shifter preferably includes a connector that connects the shifted rolls at the rotational axes thereof to provide coordinated movement of the rolls during the shifting. An actuator of the roll shifter moves the connector along the direction of conveyance to effect the roll shifting. The roll shifter has particular utility when utilized with a conveyor roll drive mechanism having a horizontally extending support member over which a continuous drive loop is slidably driven with the shifted rolls supported and frictionally driven by the drive loop. Antifriction bearings preferably support the roll connector on the support member for movement along the direction of conveyance to provide the roll shifting. Shields mounted in the connector between the rolls prevent cullett from falling onto the drive loop and lifting the rolls upwardly therefrom in a manner that distorts the planarity of any heated glass sheet conveyed on the rolls. Opposite ends of the conveyor rolls are preferably respectively supported and frictionally driven by a pair of the continuous drive loops that are respectively driven over associated horizontally extending support members on which connector members of the roll connector are supported by the antifriction bearings.

The actuator that moves the connector preferably includes a pivotal link having a first end coupled with the connector and a pivotally supported intermediate portion. An eccentric cam pivots the second end of the link on the opposite side of the pivotal axis thereof as the first link end to move the connector in order to shift the rolls. Two such links which are respectively connected to a pair of connector members at opposite ends of the rolls and associated cams which are connected to each other by a coupling shaft provide the shifting of the rolls while maintaining a parallel relationship of the rolls.

The sensor utilized to detect glass sheet conveyance is located adjacent the bending apparatus and operates the roll shifter to control the effective rate of conveyance of any glass sheet supported by the shifted rolls. The effective rate of glass sheet conveyance is preferably decreased such that the glass is stationary with respect to the bending apparatus so as to be received thereby from the conveyor without any sliding. With the friction drive loop type of drive mechanism, the zero rate of effective conveyance is achieved by shifting the rolls in a direction opposite the direction of glass sheet conveyance at a rate equal to one half the rate of drive loop movement. The sensor is located upstream from the bending apparatus and the roll shifter so as to be capable of operating the roll shifter in order to reposition a glass sheet supported by the shifted rolls with respect to a glass sheet upstream from the shifted rolls.

In another embodiment, the roll operator comprises a positioning drive for driving the associated rolls independently of the other rolls of the conveyor to provide the control of glass sheet conveyance adjacent the bending apparatus. Operation of the positioning drive to provide a slower rate of conveyance than on the rest of the conveyor reduces sliding of the glass sheet with respect to the bending apparatus as the glass sheet is received thereby from the conveyor. Like the other embodiment, any suitable sensing system can be utilized when leading and trailing glass sheets are conveyed so as to sense the conveyance of the leading glass sheet onto the rolls driven by the positioning drive adjacent the bending apparatus. The positioning drive then increases or decreases the rotational driving rate of these rolls to reposition the leading glass sheet either upstream or downstream with respect to the trailing glass sheet. When the system with the positioning drive is utilized to simultaneously bend two glass sheets, two shifting operations are sequentially performed to initially reposition the glass sheets with respect to each other and to thereafter reduce the rate of conveyance adjacent the bending apparatus to decrease the sliding that takes place as the glass sheets are received thereby from the conveyor.

In its preferred construction, the positioning drive includes a first continuous drive loop that drives the rolls adjacent the bending apparatus, and the conveyor drive mechanism includes a second continuous drive loop for driving the other rolls of the conveyor. A pair of the first continuous drive loops and a pair of the second continuous drive loops are most preferably provided to drive the rolls, and a horizontal support surface is associated with each drive loop with the drive loop slidably supported thereby and the associated rolls supported thereon for frictional driving. Both pairs of drive loops preferably comprise chains, and the positioning drive loops are most preferably roller chains that are driven by an electric motor drive mechanism under the control of a monocard operated computer that is also responsive to the sensor which detects glass sheet conveyance.

In both embodiments, the glass sheet bending system embodying the invention includes a furnace defining a heating chamber through which the roller conveyor conveys glass sheets for heating in preparation for the bending. The bending apparatus of the preferred system includes a holder received within the heating chamber above the conveyor for receiving heated glass sheets therefrom and also includes a bending mold or a pair of such molds for receiving the glass sheets from the holder for the bending.

The above objects, and other objects, features, and advantages of the present invention are readily apparent from the following detailed description of the best modes for carrying out the invention when taken in connection with the accompanying drawings.

BRIEF DESCRIPTION OF DRAWINGS

FIG. 7 is a schematic side elevation view of a glass sheet bending system including a horizontal roller conveyor having a roll operator constructed in accordance with the present invention and embodied by a positioning drive;

FIG. 8 is a schematic top plan view taken along line 8—8 in FIG. 7 to illustrate the bending system including the positioning drive;

FIG. 9 is a view of a portion of FIG. 7 but on an enlarged scale to more clearly illustrate the positioning drive;

BEST MODES FOR CARRYING OUT THE INVENTION

Figure 1:
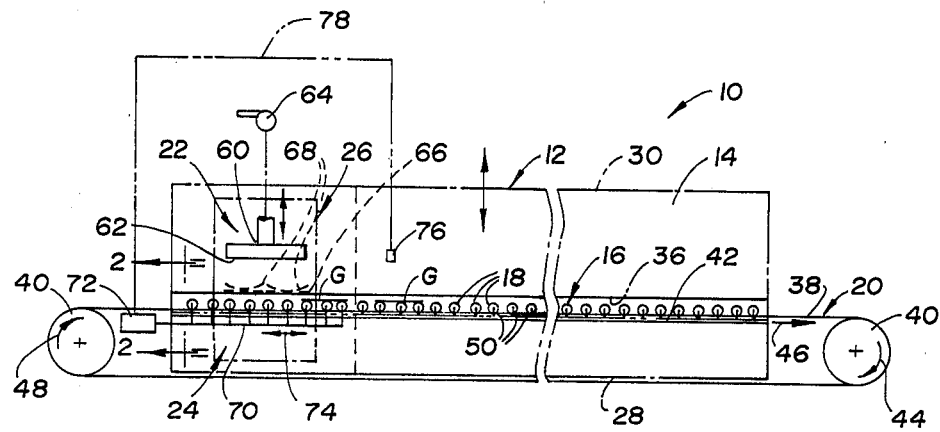
FIG. 1 is a schematic side elevation view of a glass sheet bending system including a horizontal roller conveyor having a roll operator constructed in accordance with the present invention and embodied by a roll shifter.

Referring to FIG. 1 of the drawings, a glass sheet bending system indicated generally by reference numeral 10 includes a schematically indicated furnace 12 having a heating chamber 14 within which glass sheets are heated and bent. A horizontal roller conveyor 16 of the system includes rolls 18 that support glass sheets during conveyance through the heating chamber 14 and which have elongated shapes extending horizontally transverse to the direction of conveyance in a parallel relationship to each other. Each conveyor roll 18 has a central rotational axis, and a drive mechanism 20 of the system drives the rolls about their rotational axes to provide conveyance of glass sheets supported on the rolls for heating within the furnace heating chamber 14. After each glass sheet G has been heated, bending apparatus 22 of the system receives the heated glass sheet to perform bending thereof in a manner which is hereinafter described. A roll operator 24 of the conveyor 16 is constructed in accordance with the present invention to operate a plurality of the conveyor rolls 18 adjacent the bending apparatus 22 in order to control movement thereof and glass sheet conveyance thereon independent of glass sheet conveyance on the other rolls of the conveyor.

The roll operator is embodied by a roll shifter 24 in the embodiment of FIGS. 1 through 6 and operates to shift a plurality of the conveyor rolls 18 adjacent the bending apparatus 22 along the direction of conveyance while maintaining the parallel relationship of the rolls with respect to each other. Drive mechanism 20 continues to rotatively drive the shifted rolls 18 during their shifting movement about the rotational axes thereof such that the shifting movement controls the conveyance of any glass sheet supported on the shifted rolls adjacent the bending apparatus. After bending, the glass sheets are moved to a schematically indicated quench unit 26 where opposed blastheads supply pressurized cooling air to the opposite surfaces of the sheets to temper the glass and thereby increase its mechanical strength.

Furnace 12 of the system includes a housing of the type disclosed by U.S. Pat. Nos. 3,934,970, 3,947,242, and 3,994,711 wherein a fixed lower housing 28 that opens upwardly and a vertically movable upper housing 30 that opens downwardly cooperatively define the heating chamber 14 in a lower closed position of the upper housing. An upper open position of the upper housing 30 provides access to the heating chamber for removal of glass when necessary as well as maintenance of the conveyor 16. In the lower closed position, insulated lower and upper side walls 32 and 34 at each lateral side of the furnace define side slots 36 through which opposite ends of the conveyor rolls 18 project for rotational driving thereof by the drive mechanism 20 to provide glass sheet conveyance.

Drive mechanism 20 for the conveyor rolls 18 preferably is of the frictional drive type disclosed by U.S. Pat. Nos. 3,806,312, 3,934,970, 3,947,242, 3,994,711 and 4,133,667. A pair of continuous drive loops 38 of the drive mechanism are embodied by solid steel belts or toothed chains and respectively drive the roll ends that project outwardly from the furnace heating chamber through the adjacent side slots 36. Each drive loop 38 is received by an associated pair of sheaves 40 and includes an upper driving reach that is slidably supported on a horizontal support member 42 that extends the length of the conveyor outside of the heating chamber and alongside the adjacent side slot 36. The external location of the driving reach with respect to the heating chamber provides a lower use temperature and thereby minimizes maintenance as well as permitting the drive loop to be embodied by a chain that includes toothed links connected by pins. Such chain type drive loops permit the sheaves 40 to have teeth that establish a positive driving relationship with the sheaves as opposed to friction developed by the wrap tension as is the case with solid steel belts, and the chains also permit the sheaves to have a much smaller diameter than can be utilized with solid steel belts due to the smaller radius of curvature the chains can assume.

The right sheave 40 of each drive loop 38 is rotatively driven in a clockwise direction as shown by arrow 44 in FIG. 1 so as to pull the upper driving reach toward the right as shown by arrow 46 and thereby also rotates the left sheave 40 in a clockwise direction as shown by arrow 48. Longitudinal positioners 50 locate the opposite ends of the rolls 18 with respect to the support member 42 along the direction of conveyance while permitting rotation of the rolls. Each roll end is supported on and frictionally driven by the driving reach of the adjacent drive loop 38 so as to provide the glass sheet conveyance, i.e. movement of the driving reach toward the right in the direction shown by arrow 46 rotates the conveyor rolls 18 counterclockwise to provide conveyance of glass sheets G supported thereon toward the left for heating and subsequent bending.

Figure 2:
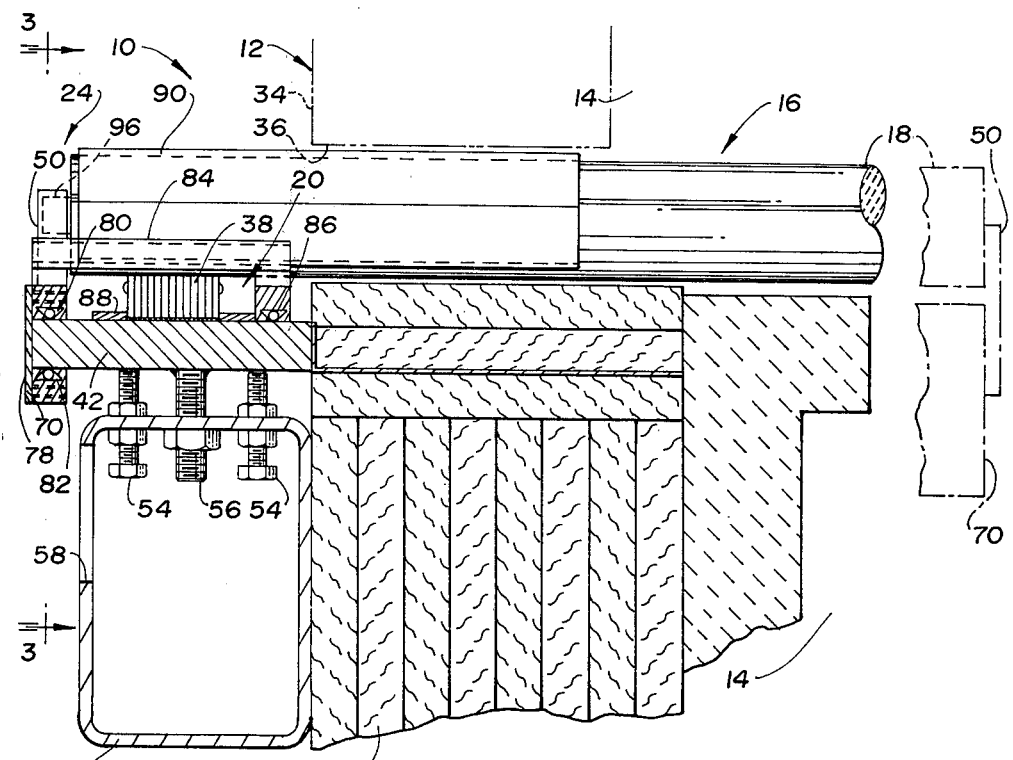
FIG. 2 is a partial sectional view through the system and the roll shifter of the conveyor taken in the direction of line 2—2 in FIG. 1.

As illustrated in FIG. 2, the support member 42 at each side of the furnace is supported on a hollow frame member 52 by push and pull bolt connections 54 and 56, respectively, at spaced positions along the length of the conveyor. Openings 58 in the frame member 52 provide access to the push and pull bolt connections 54 and 56 for vertically adjusting the support member 32 in order to locate the upper sides of all of the conveyor rolls 18 in a single plane so as to insure planarity of the conveyed glass.

Bending apparatus 22 shown in FIG. 1 is of the type disclosed by U.S. Pat. Nos. 4,202,681, 4,204,854, 4,222,763, and 4,282,026 wherein a vertically movable holder 60 has a downwardly facing surface 62 with restricted openings spaced over the extent thereof and connected to a vacuum drawing unit 64 that draws a vacuum within the openings. Downward movement of the holder 60 into proximity with a heated glass sheet G conveyed thereunder and drawing of the vacuum lifts the heated glass sheet so as to be secured to the downwardly facing holder surface 62. Upward movement of the holder 60 and subsequent movement of a mold shuttle 66 under the raised holder is followed by termination of the drawn vacuum such that the lifted glass sheet G is dropped onto a mold 68 on the shuttle for bending. Thereafter, movement of the shuttle 66 out of the furnace heating chamber 14 to the quench unit 26 provides tempering of the bent glass sheet.

Roll shifter 24 shown in FIG. 1 includes a connector 70 that supports the longitudinal positioners 50 of conveyor rolls 18 adjacent the bending apparatus 22. An actuator 72 of the roll shifter moves the connector 70 to the right and the left as shown by arrow 74 to shift the connected rolls 18 and thereby control the effective rate of conveyance of any glass sheet supported by the shifted rolls. Just prior to a glass sheet being lifted upwardly off the conveyor rolls 18 into engagement with the holder surface 62, the roll shifter actuator 72 moves the connector 70 toward the right to decrease and preferably completely eliminate any relative movement of the glass sheet with respect to the holder surface so that no sliding therebetween takes place upon the initial engagement. The rate of shifting movement is equal to one half the rate of drive loop movement to completely eliminate relative movement between the glass sheet and the holder surface 62. Eliminating the sliding upon glass pick-up reduces wear of the holder surface 62 and also reduces the possibility of scratching the upper glass surface against the holder surface. Drive mechanism 20 continues to rotate the shifted rolls 18 during movement thereof toward the right such that there is relative conveyance of the glass sheet thereon with respect to the rolls in order to prevent the possibility of marking the lower glass surface as is much more likely to take place if the glass is stopped on the rolls. Thus, the operation of the roll shifter 24 provides high quality glass by preventing marking of the upper and lower surfaces during the lifting operation and also helps maintain the integrity of the downwardly facing surface 62 of the holder.

A suitable sensor 76 illustrated schematically in FIG. 1 detects glass sheet conveyance upstream from the bending apparatus and from the roll shifter 24 and is coupled as schematically indicated at 78 to the roll shifter actuator 72 which is also coupled to circuitry that controls the operation of the holder 60 and the driving of the continuous drive loops 38 in order to coordinate the roll shifting operation with the glass conveyance and holder lifting. When the system 10 is equipped with two molds 68 to simultaneously bend a pair of upstream and downstream glass sheets, an initial operation of roll shifter 24 is preformed before the roll shifting upon glass pickup by the holder 16 in order to provide repositioning of the glass sheets along the length of the conveyor with respect to each other in order to insure the proper location of the sheets upon being deposited onto the molds 68. Sensor 76 detects the conveyance of the leading glass sheet G onto the conveyor rolls 18 coupled by the connector 70 and subsequently detects the conveyance of the trailing glass sheet such that suitable circuitry can determine the spaced relationship therebetween and then operate the actuator 72 to move the connector 70 toward the right or the left such that the glass sheets are spaced from each other the required distance. Rotational driving of the rolls as the shifting takes place prevents the lower surface of the leading glass sheet G which is shifted from being marked since conveyance thereof continues relative to the rolls. After the initial roll shifting, actuator 72 shifts the connector 70 toward the right just prior to lifting of the glass sheets off the conveyor rolls 18 in the manner previously described into secured engagement with the holder surface 62.

Figure 3:
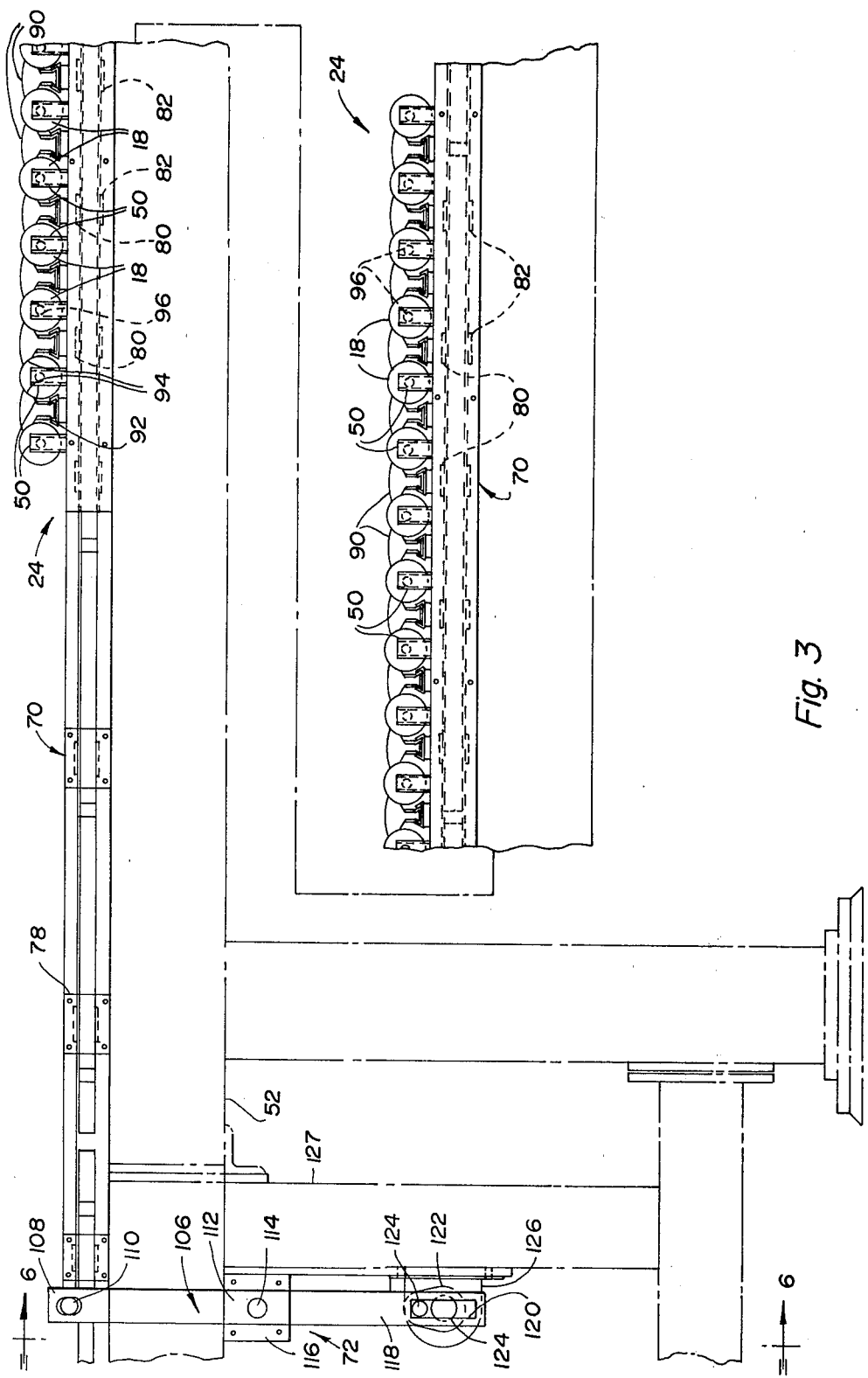
FIG. 3 is a side elevation view of the roll shifter taken in the direction of line 3—3 in FIG. 2.

With combined referece to FIGS. 2 and 3, the connector 70 of the roll shifter includes a pair of connector members 78 respectively located adjacent the support members 42 over which the driving reaches of the pair of drive loops 38 are driven at each side of the furnace. Each connector member 78 includes upper and lower antifriction bearings 80 and 82 at the outboard side of the associated support member 42. Inward extensions 84 of the connector member 78 extend over the drive loop 38 and have distal inner ends including an upper inboard antifriction bearing 86 inboard from the drive loop. Between the outboard and inboard upper antifriction bearings 80 and 86, the support member 42 includes a shallow channeled slide plate 88 that guides the drive loop between the bearings. Above the drive loop 38, each inward extension 84 of the connector member 78 supports an associated high temperature shield 90 for preventing cullett from falling between the rolls 18 onto the drive loop and lifting the rolls upwardly. Roll shields 90 have a mushroom shape when viewed from the side with a lower flared end secured by a somewhat U-shaped sheet metal retainer 92 that is welded to the associated inward extension 84 of the connector member. Enlarged upper ends of the shields 90 have partially circular surfaces 94 that are complementary to the conveyor rolls 18 so as to permit the roll rotation without allowing cullett to fall downwardly between the rolls onto the drive loop.

Figure 4:
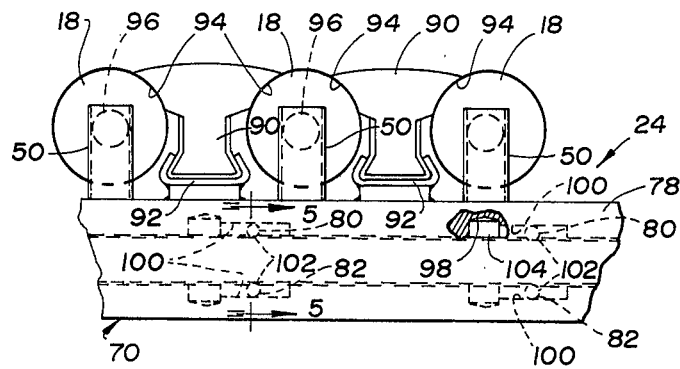
FIG. 4 is an enlarged view of a portion of the roll shifter taken in the same direction as FIG. 3.

With combined reference to FIGS. 2 and 4, each roll positioner 50 associated with the roll shifter 24 has a lower end mounted on the connector member 78 and defines an inwardly opening channel that extends vertically and receives a central end pin 96 of the associated conveyor roll 18. The roll positioners 50 associated with the conveyor rolls upstream from the bending apparatus 22 illustrated in FIG. 1 have a similar construction but with the lower ends thereof supported on the support member 42 over which the drive loop 38 is slidably driven as previously mentioned.

Figure 5:
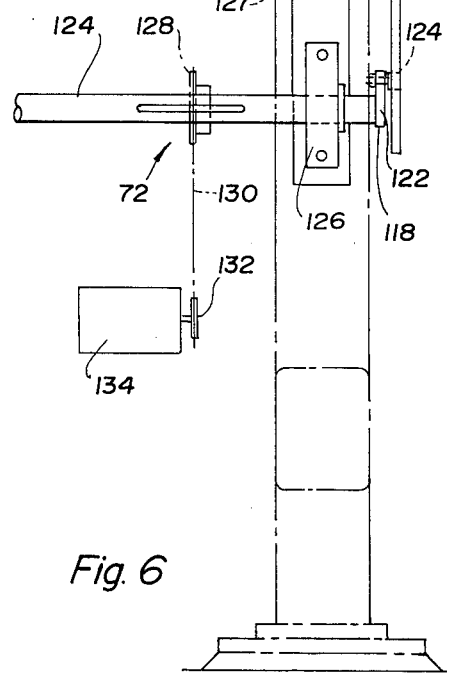
FIG. 5 is a sectional view taken in the direction of 5—5 in FIG. 4 and illustrates an antifriction bearing that supports a roll connector of the roll shifter on a support member of a conveyor drive mechanism.

Each of the antifriction bearings 80, 82 and 86 shown in FIG. 2 has a construction that is further illustrated in FIGS. 4 and 5. Adjacent each antifriction bearing, a hole 98 is drilled into the connector member 78. Thereafter, a milling cutter is inserted into the hole 98 and then moved longitudinally therefrom to machine a groove 100 having an inwardly flared shape as seen in FIG. 5. Of course, the diameter of the hole 98 must be greater than the maximum width of the groove 100 so that the milling cutter can be inserted into the hole prior to machining the groove. An appropriately sized bearing ball 102 is then inserted into the groove 102 and a plug 104 is subsequently pressed into the hole 98 such that the bearing ball is held within the groove in a captured relationship while projecting partially outwardly therefrom to provide the rolling antifriction support of the bearing on the support member 42.

Figure 6:
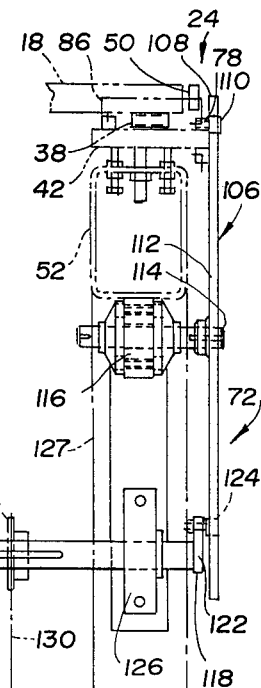
FIG. 6 is an end view of the roll shifter taken along the direction of line 6—6 in FIG 3 to illustrate an actuator that moves the roll connector to provide shifting of the rolls.

With combined reference to FIGS. 3 and 6, the actuator 72 of the roll shifter includes a pair of links 106 respectively located at opposite sides of the system. A first upper end 108 of each link 106 includes a pin and slot connection 110 to the adjacent end of the roll connector member 78. An intermediate portion 112 of the link 106 is supported by a shaft 114 which is pivotal within a bearing 116 that is secured to the lower side of the adjacent frame member 52 of the system framework. Link 106 is thus pivotal about the axis of shaft 114 in order to shift the connector 70 longitudinally with respect to the direction of conveyance in the manner previously discussed. A second lower end 118 of the link 106 is located on the opposite side of the pivotal axis of shaft 114 as the first link end 108 and includes a slot 120. An eccentric cam 122 of the actuator includes a roller 124 received within the link slot 120. Cam 122 is supported by the distal end of a coupling shaft 124 which is mounted by a bearing 126 on a vertical frame member 127 of the system framework. A chain sprocket 128 on shaft 124 receives a continuous chain 130 that is driven by a sprocket 132 of an electric motor 134 under the control of suitable circuitry. Electric motor 134 thus rotates the shaft 124 in order to pivot the pair of cams 122 at each end thereof and thereby pivot the associated links 106 in order to shift the roll connector 70 in the manner previously described.

In FIGS. 7 through 11, another system 10' is illustrated and, except as will be noted, is the same as the previously described system 10. As such, like reference numerals are applied to the like components and the previous description is thus applicable such that no repetition thereof is necessary.

With reference to FIGS. 7 and 9, system 10' includes a furnace 12 defining a heating chamber 14, a horizontal roller conveyor 16 having conveyor rolls 18, a drive mechanism 20 for the conveyor rolls 18, and bending apparatus 22 that receives one or more heated glass sheets from the conveyor for bending in the same manner as the previously described embodiment. A roll operator 140 of the conveyor 16 is constructed in accordance with the present invention to operate a plurality of the conveyor rolls 18 adjacent the bending apparatus 22 in order to control movement thereof and glass sheet conveyance thereon independent of glass sheet conveyance on the other rolls of the conveyor.

With continuing reference to FIGS. 7 and 9, the roll operator of the conveyor 16 in system 10' is embodied by a positioning drive 140 which drives the associated conveyor rolls 18 below the bending apparatus 22 independently of the other rolls of the conveyor to provide the control of glass sheet conveyance adjacent the bending apparatus 22. Upstream from the bending apparatus 22, the conveyor rolls 18 are driven by the drive mechanism 20 to provide glass sheet conveyance during heating. Similarly, downstream from the bending apparatus 22, the conveyor rolls 18 are also driven by the drive mechanism 20 to provide glass sheet conveyance from the bending apparatus if the cycle has to be aborted for any reason. After the holder 60 has received one or more glass sheets for bending, the shuttle 66 is moved to below the holder by a control 142 (FIG. 8) to position one or more holds 68 below the holder to receive each glass sheet for bending in the manner previously described. Thereafter, the control 142 moves the shuttle 66 and each mold 68 thereon to the quench unit 26 for tempering of each glass sheet.

Figure 10:
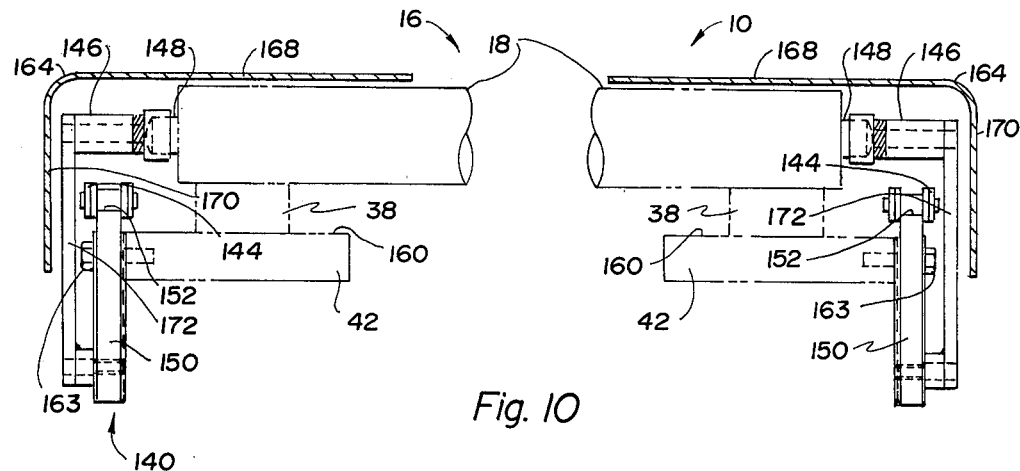
FIG. 10 is a sectional view taken along the direction of line 10—10 in FIG. 9 upstream from the location at which the positioning drive operates the conveyor rolls.
Figure 11:
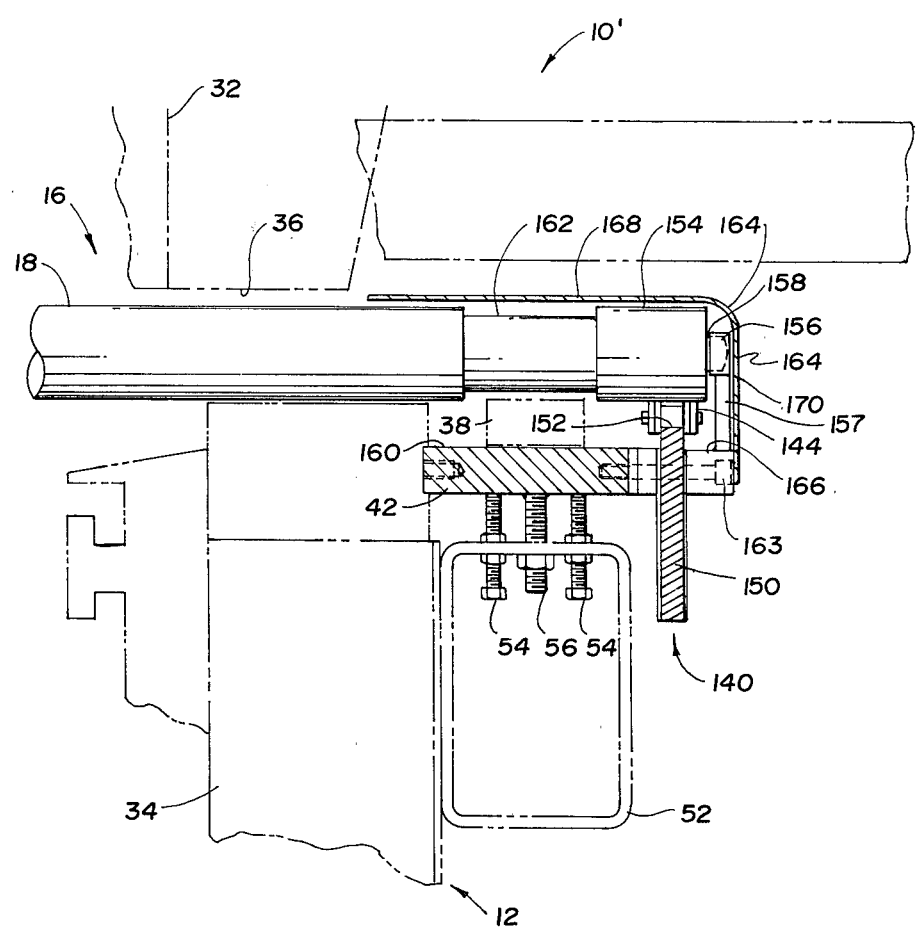
FIG. 11 is a sectional view at one side of the system taken along line 11—11 in FIG. 9 at the location where the positioning drive operates the conveyor rolls.

With reference to FIGS. 9, 10, and 11, the positioning drive 140 includes a first continuous drive loop 144 which is preferably embodied by a roller chain that drives the conveyor rolls 18 adjacent the bending apparatus 22. As previously described, drive mechanism 20 includes a second continuous drive loop 38 for driving the other rolls 18 of the conveyor 16 upstream and downstream from the bending apparatus 22.

With particular reference to FIGS. 10 and 11, the positioning drive 140 most preferably includes a pair of the first continuous drive loops 144 located adjacent opposite ends of the conveyor rolls 18 at which fixed positioners 146 receive and position roll end pins 148 concentric with the central rotational axes of the conveyor rolls. Such positioning prevents movement of the conveyor rolls along the direction of conveyance but permits rotational driving of the conveyor rolls as is more fully hereinafter described. Conveyor 16 also includes a pair of the second continuous drive loops 38 located adjacent opposite ends of the rolls inboard from the first pair of continuous drive loops 144. A pair of support members 150 associated with the first pair of drive loops 144 include associated support surfaces 152 on which the roller chains embodying the pair of first drive loops are slidably supported and driven. As seen in FIG. 11, the end of each conveyor roll 18 adjacent the bending apparatus 22 includes a suitable end cap 154 that is supported on and frictionally driven by the adjacent drive loop 144 whose movement along the support surface 152 of the support member 150 frictionally rotates the conveyor roll. A fixed positioner 156 on a support 157 engages an end pin 158 of the end cap 154 along the central axis of the roll rotation in order to prevent movement of the roll along the direction of conveyance while permitting rotation thereof under the driving operation of the drive loop 144. The pair of support members 42 of the conveyor also respectively define a pair of support surfaces 160 on which the second pair of drive loops 38 are slidably supported with the ends of the adjacent conveyor rolls 18 supported thereon for frictional driving.

It should be noted that the first pair of drive loops 144 are spaced outwardly from the ends of the conveyor rolls 18 as shown in FIG. 10 except adjacent the bending apparatus so as to permit the second pair of drive loops 38 to provide the conveyor roll driving of these rolls. Adjacent the bending apparatus as illustrated in FIG. 11, each conveyor roll includes a reduced size portion 162 aligned with the adjacent second drive loop 38 so as to permit driving of the conveyor rolls 18 adjacent the bending apparatus by the first pair of drive loop 144.

As illustrated in FIG. 11, each support member 42 is supported on the associated frame member 52 by push and pull bolt connections 54 and 56 in the manner previously described to provide vertical adjustment thereof and thereby insure that all of the conveyor rolls 18 have their upper sides located in a single plane to maintain planarity of the heated glass sheets. Support members 150 are each secured by bolts 163 to the outboard side of the adjacent support member 42 and may include a suitable vertical adjustment that maintains the upper side of the conveyor rolls 18 in a single plane to insure planarity of conveyed glass sheets. This adjustment may be accomplished by providing the support member 150 with a vertical slot through which the securement bolt 163 extends. A shield 164 is mounted on the support member 150 as illustrated in FIG. 11 by an extension 166 through which the securement bolt 163 extends. An upper horizontal leg 168 of the shield 164 extends over the first and second drive loops 144 and 38 to prevent glass cullett from falling onto the drive loops and interfering with the driving operation. A lower vertical leg 170 of the shield 164 provides support thereof on extension 166 just outboard of the positioners 156 mounted by supports 157 also on the extension 166 adjacent the bending apparatus. Adjacent the other rolls of the conveyor, a support 172 has a lower end secured to the support member 150 and an upper end that mounts the adjacent fixed positioners 146 that locate the roll end pins 148 of the adjacent roll ends in the manner previously described.

With reference to FIG. 9, the drive loops 144 of the positioning drive 140 each have a reach 174 extending downwardly from the conveyor to an electric motor drive mechanism 176 which includes a driving sprocket 178. Each drive loop 144 also includes a reach 180 that extends from the drive sprocket 178 upwardly in an inclined orientation to an idler sprocket 182 from which the drive loop extends to the adjacent end of the support member 150. Drive loop 144 includes a driving reach that extends along the support member 150 to provide roll driving in the manner previously described. At the opposite end of the support member 150 from the idler sprocket 182, the drive loop 144 is connected to the reach 174 thereof extending downwardly to the drive sprocket 178. A suitable cross shaft connects the pair of drive sprockets 178 at the opposite sides of the system. A schematically indicated computer 184 which preferably includes a monocard input operates the drive mechanism 176 under the control of a sensor 76 in coordination with the drive mechanism 20 and the bending apparatus 22. Also, a schematically indicated guard 185 encloses each first drive loop 144.

With combined reference to FIGS. 7 and 9, sensor 76 of the bending system 10″ detects glass sheet conveyance adjacent the bending apparatus 22. The positioning drive 140 and the drive mechanism 20 provide conveyance at the same speed as the glass is moved onto the rolls 18 driven by the positioning drive. At the appropriate time, the positioning drive 140 is operated in order to decrease the rate of conveyance as the bending apparatus initially receives each glass sheet to perform the bending. The rate of conveyance is preferably decreased to a creep rate to reduce sliding and increase location accuracy between the holder surface 62 and each glass sheet as the holder 60 is moved downwardly and a differential gas pressure is supplied to the surface thereof by the vacuum unit 24 in order to secure the glass sheet for bending. Thereafter, upward movement of the holder spaces each heated glass sheet above the conveyor to permit the shuttle 66 to move each mold 68 below the holder to receive the glass sheets for bending under the impetus of gravity. Movement of the shuttle under the operation of the control 142 (FIG. 8) then moves each bent glass sheet to the quench unit 26 for tempering. This decrease in the rate of conveyance can be utilized when one, two, or any number of glass sheets are to be bent on a like number of molds carried by the shuttle 66.

When two glass sheets G are to be bent such as is often the case with right and left vehicle windows, the sensor 76 senses glass sheet conveyance upstream from the bending apparatus in order to provide repositioning of the two glass sheets with respect to each other. The leading glass sheet is sensed and upon movement thereof onto the conveyor rolls 18 driven by the positioning drive 140, the operation of the drive mechanism 176 under the control of computer 184 increases or decreases the rate of conveyance of the conveyor rolls adjacent the bending apparatus in order to reposition the leading glass sheet upstream or downstream with respect to the trailing glass sheet supported on the conveyor rolls driven by the drive mechanism 20 upstream from the bending apparatus. After the proper positioning has been provided, the positioning drive 140 drives the conveyor rolls 18 adjacent the bending apparatus at the same speed as the other conveyor rolls so that the trailing glass sheet can be received by the rolls driven by the positioning apparatus for conveyance with the leading sheet below the holder in preparation for the bending cycle as previously described.

When a pair of leading and trailing glass sheets are to be bent, the sensor 76 provides a means for sensing the glass sheet conveyance upstream from the bending apparatus and operates the computer 184 whose control of the drive mechanism 176 provides a two step operation of the positioning drive 140. Initially, the positioning drive 140 is operated in order to reposition a first leading glass sheet supported by the rolls driven thereby with respect to a second trailing glass sheet upstream from the bending apparatus 22. Thereafter, the positioning drive 140 is operated with both the first leading glass sheet and the second trailing glass sheet on the rolls driven thereby in order to decrease the rate of conveyance as the holder 60 of the bending apparatus initially receives both glass sheets in preparation for lifting the glass sheets above the conveyor for bending.

While the best modes for carrying out the invention have herein been described in detail, those familiar with the art to which this invention relates will recognize various alternative designs and embodiments for practicing the present invention as defined by the following claims.

What is claimed is:

1. In a glass sheet bending system including a horizontal roller conveyor for conveying heated glass sheets, said conveyor including elongated rolls extending horizontally transverse to the direction of conveyance in a parallel relationship to each other, each roll having a central rotational axis, a drive mechanism for rotatively driving the rolls about the rotational axes thereof to convey glass sheets supported thereby, and bending apparatus for receiving heated glass sheets from the conveyor to perform bending thereof, the improvement comprising: a roll shifter for shifting a plurality of rolls adjacent the bending apparatus along the direction of conveyance during driving thereof while maintaining the parallel relationship therebetween and permitting continued rotation of these rolls about the rotational axes thereof so as to thereby provide the control of glass sheet conveyance adjacent the bending apparatus.

2. A system as in claim 1 wherein the roll shifter includes a connector that connects the rolls which are shifted at the rotational axes thereof to provide coordinated movement thereof, and an actuator that moves the connector along the direction of conveyance to effect the roll shifting.

3. A system as in claim 2 wherein the roll drive mechanism includes a horizontally extending support member and a continuous drive loop slidably driven thereover with all of the rolls supported and frictionally driven thereby, and antifriction bearings for supporting the connector on the support member for movement along the direction of conveyance.

4. A system as in claim 3 wherein the roll shifter includes shields mounted on the connector between the rolls so as to prevent cullett from falling onto the drive loop and lifting the rolls upwardly.

5. A system as in claim 2 or 3 wherein the actuator includes a pivotal link having a first end coupled with the connector and a pivotally supported intermediate portion as well as a second end on the opposite side of the pivotal axis thereof as the first end, and an eccentric cam for pivoting the second end of the link to thereby pivot the first link end and move the connector.

6. A system as in claim 1 further including a sensor for detecting glass sheet conveyance adjacent the bending apparatus to operate the roll shifter in order to decrease the effective rate of conveyance as the bending apparatus initially receives each glass sheet to perform the bending.

7. A system as in claim 6 wherein the roll shifter is moved at a rate such that each glass sheet effectively stops upon being received by the bending apparatus.

8. A system as in claim 1 further including a sensor for sensing glass sheet conveyance upstream from the bending apparatus and the roll shifter so as to operate the roll shifter in order to reposition a glass sheet supported by the shifted rolls with respect to a glass sheet upstream from the roll shifter.

9. In a glass sheet bending system including a furnace having a heating chamber, a horizontal roller conveyor for conveying glass sheets through the heating chamber for heating thereof, said conveyor including elongated rolls extending horizontally transverse to the direction of conveyance in a parallel relationship to each other, each roll having opposite ends respectively aligned with the ends of the other rolls and a central rotational axis through the roll, a drive mechanism for rotatively driving the rolls about the rotational axes thereof to convey glass sheets supported thereby, and bending apparatus including a holder within the heating chamber above the conveyor for receiving a heated glass sheet therefrom and a bending mold for thereafter receiving the glass sheet from the holder for bending thereof, a roll shifter comprising: a connector that connects aligned sets of ends of a plurality of rolls adjacent the bending apparatus for shifting movement along the direction of conveyance while maintaining the parallel relationship thereof and permitting continued rotational driving of these rolls about the rotational axes thereof; and an actuator that moves the connector along the direction of conveyance to shift the rolls connected thereto and thereby control the conveyance of any glass sheet supported thereby adjacent the bending apparatus.

10. In a glass sheet bending system including a furnace having a heating chamber, a horizontal roller conveyor for conveying glass sheets through the heating chamber for heating thereof, said conveyor including elongated rolls extending horizontally transverse to the direction of conveyance in a parallel relationship to each other, each roll having opposite ends respectively aligned with the ends of the other rolls and having a central rotational axis through the roll, a friction drive mechanism for rotatively driving the rolls about the rotational axes thereof to convey glass sheets supported thereby, and bending apparatus including a holder within the heating chamber above the conveyor for receiving a heated glass sheet therefrom and a bending mold for thereafter receiving the glass sheet from the holder for bending thereof, a roll shifter comprising: a connector that connects aligned sets of ends of a plurality of rolls adjacent the bending apparatus for shifting movement along the direction of conveyance while maintaining the parallel relationship thereof and permitting continued rotational driving of these rolls about the rotational axes thereof; an actuator that moves the connector along the direction of conveyance to shift the rolls connected thereto and thereby control the conveyance of any glass sheet supported thereby adjacent the bending apparatus; and a sensor for detecting glass sheet conveyance adjacent the bending apparatus to operate the actuator in response thereto in preparation for bending.

11. In a glass sheet bending system including a furnace having a heating chamber, a horizontal roller conveyor for conveying glass sheets through the heating chamber for heating thereof, said conveyor including elongated rolls extending horizontally transverse to the direction of conveyance in a parallel relationship to each other, each roll having opposite ends respectively aligned with the ends of the other rolls and having a central rotational axis through the roll, a friction drive mechanism including a pair of continuous drive loops for respectively supporting and frictionally driving the opposite ends of the rolls so as to convey glass sheets supported thereby, the drive mechanism also including horizontal support members over which the pair of drive loops are respectively driven, and bending apparatus including a holder within the heating chamber above the conveyor for receiving a heated glass sheet therefrom and a bending mold for thereafter receiving the glass sheet from the holder for bending thereof, a roll shifter comprising: a connector that connects aligned sets of ends of a plurality of rolls adjacent the bending apparatus for shifting movement along the direction of conveyance while maintaining the parallel relationship thereof and permitting continued rotational driving of these rolls about the rotational axes thereof; bearings that support the connector for movement on the horizontal support members along the direction of conveyance; an actuator that moves the connector along the direction of conveyance to shift the rolls connected thereto and thereby control the conveyance of any glass sheet supported thereby adjacent the bending apparatus; and a sensor for detecting glass sheet conveyance adjacent the bending apparatus to operate the actuator in order to stop each glass sheet with respect to the holder of the bending apparatus upon being received thereby in preparation for bending.

12. In a glass sheet bending system including a furnace having a heating chamber, a horizontal roller conveyor for conveying glass sheets through the heating chamber for heating thereof, said conveyor including elongated rolls extending horizontally transverse to the direction of conveyance in a parallel relationship to each other, each roll having opposite ends respectively aligned with the ends of the other rolls and having a central rotational axis through the roll, a friction drive mechanism including a pair of continuous drive loops for respectively supporting and frictionally driving the opposite ends of the rolls so as to convey glass sheets supported thereby, the drive mechanism also including horizontal support members over which the pair of drive loops are respectively driven, and bending apparatus including a holder within the heating chamber above the conveyor for receiving a pair of leading and trailing heated glass sheets therefrom and a pair of bending molds for thereafter receiving said pair of heated glass sheets from the holder for bending thereof, a roll shifter comprising: a connector that connects aligned sets of ends of a plurality of rolls adjacent the bending apparatus for shifting movement along the direction of conveyance while maintaining the parallel relationship thereof and permitting continued rotational driving of these rolls about the rotational axes thereof; bearings that support the connector for movement on the horizontal support members along the direction of conveyance; an actuator that moves the connector along the direction of conveyance to shift the rolls connected thereto and thereby control the conveyance of any glass sheet supported thereby adjacent the bending apparatus; and a sensor for detecting glass sheet conveyance upstream from the roll shifter to operate the actuator with said leading glass sheet on the shifted rolls and said trailing glass sheet upstream therefrom in order to provide the proper positioning thereof with respect to each other in preparation for being received by the holder and the molds to perform the bending.

13. In a glass sheet bending system including a furnace having a heating chamber, a horizontal roller conveyor for conveying glass sheets through the heating chamber for heating thereof, said conveyor including elongated rolls extending horizontally transverse to the direction of conveyance in a parallel relationship to each other, each roll having opposite ends respectively aligned with the ends of the other rolls and having a central rotational axis through the roll, a friction drive mechanism including a pair of continuous drive loops for respectively supporting and frictionally driving the opposite ends of the rolls so as to convey glass sheets supported thereby, the drive mechanism also including horizontal support members over which the pair of drive loops are respectively driven, and bending apparatus including a holder within the heating chamber above the conveyor for receiving a pair of leading and trailing heated glass sheets therefrom and a pair of bending molds for thereafter receiving the pair of heated glass sheets from the holder for bending thereof, a roll shifter comprising: a connector that connects aligned sets of ends of a plurality of rolls adjacent the bending apparatus for shifting movement along the direction of conveyance while maintaining the parallel relationship thereof and permitting continued rotational driving of these rolls about the rotational axes thereof; bearings that support the connector for movement on the horizontal support members along the direction of conveyance; an actuator that moves the connector along the direction of conveyance to shift the rolls connected thereto and thereby control the conveyance of any glass sheet supported thereby adjacent the bending apparatus; and sensing means for sensing glass sheet conveyance adjacent the bending apparatus to: (1) initially operate the actuator with said leading glass sheet on the shifted rolls and said trailing glass sheet upstream therefrom in order to provide the proper positioning thereof with respect to each other in preparation for bending, and (2) thereafter operate the actuator in order to stop both glass sheets with respect to the holder of the bending apparatus upon being received thereby in preparation for bending.

* * * * *